United States Patent
Bauman et al.

(10) Patent No.: US 9,541,636 B2
(45) Date of Patent: Jan. 10, 2017

(54) VEHICLE REMOTE FUNCTION SYSTEM AND METHOD USING ULTRA-WIDE BAND SIGNALS

(71) Applicant: Lear Corporation, Southfield, MI (US)

(72) Inventors: Jason Bauman, Huntington Woods, MI (US); Thomas O'Brien, Troy, MI (US); Keith A. Christenson, Canton, MI (US); Hilton W. Girard, III, West Bloomfield, MI (US); Jian Ye, Troy, MI (US)

(73) Assignee: Lear Corporation, Southfield, MI (US)

( * ) Notice: Subject to any disclaimer, the term of this patent is extended or adjusted under 35 U.S.C. 154(b) by 93 days.

(21) Appl. No.: 13/923,522

(22) Filed: Jun. 21, 2013

(65) Prior Publication Data

US 2013/0342379 A1    Dec. 26, 2013

(51) Int. Cl.
*G08B 21/00* (2006.01)
*G01S 13/02* (2006.01)
*G01S 13/87* (2006.01)

(52) U.S. Cl.
CPC .......... *G01S 13/0209* (2013.01); *G01S 13/878* (2013.01)

(58) Field of Classification Search
CPC .................................................. G01B 14/878
USPC ..... 340/5.6, 5.61, 5.64, 5.65, 5.7, 5.71, 5.72
See application file for complete search history.

(56) References Cited

U.S. PATENT DOCUMENTS

| | | | |
|---|---|---|---|
| 5,051,751 A | 9/1991 | Gray | |
| 5,572,555 A | 11/1996 | Soenen et al. | |
| 5,794,155 A | 8/1998 | Andresen et al. | |
| 5,832,046 A | 11/1998 | Li et al. | |
| 5,867,411 A | 2/1999 | Kumar | |
| 6,208,239 B1 | 3/2001 | Mueller et al. | |
| 6,385,542 B1 | 5/2002 | Millington | |

(Continued)

FOREIGN PATENT DOCUMENTS

| CN | 1900654 A | 1/2007 |
|---|---|---|
| CN | 102104435 A | 6/2011 |

(Continued)

OTHER PUBLICATIONS

Combined Search and Examination Report for GB1311161.2 dated Dec. 19, 2013.

(Continued)

*Primary Examiner* — Jeffery Hofsass
(74) *Attorney, Agent, or Firm* — Brooks Kushman P.C.

(57) ABSTRACT

A vehicle remote function system is provided for determining a location of a fob relative to a vehicle. The system includes a controller adapted to be mounted in the vehicle and configured for communication with antennas mounted at different vehicle locations, the controller for use in determining the location of the fob based on ultra-wide band wireless signals transmitted between the antennas and the fob. The controller is configured to locate the fob within one of multiple three-dimensional zones, one of the zones configured to have a non-spherical shape. A method is also provided for use in a vehicle remote function system, the method for determining a location of a fob relative to a vehicle. The method includes transmitting ultra-wide band wireless signals between the vehicle and the fob, and determining the location of the fob within one of multiple three-dimensional zones, one of the zones having a non-spherical shape.

20 Claims, 1 Drawing Sheet

(56) References Cited

U.S. PATENT DOCUMENTS

| | | | |
|---|---|---|---|
| 6,552,649 B1 | 4/2003 | Okada et al. | |
| 6,580,353 B1* | 6/2003 | Geber et al. | 340/5.61 |
| 7,071,817 B2 | 7/2006 | Haselsteiner et al. | |
| 7,496,204 B2 | 2/2009 | Suzuki | |
| 7,705,710 B2 | 4/2010 | Hermann | |
| 7,843,318 B2 | 11/2010 | Funayose et al. | |
| 7,889,096 B2 | 2/2011 | Breeed | |
| 8,175,983 B2 | 5/2012 | Okada | |
| 8,232,863 B2 | 7/2012 | Nakajima et al. | |
| 8,248,233 B2 | 8/2012 | Silverman et al. | |
| 8,284,020 B2 | 10/2012 | Ghabra et al. | |
| 8,319,605 B2 | 11/2012 | Hassan et al. | |
| 8,319,616 B2 | 11/2012 | Girard, III et al. | |
| 8,344,850 B2 | 1/2013 | Girard, III et al. | |
| 8,373,581 B2 | 2/2013 | Hassan et al. | |
| 8,427,276 B2 | 4/2013 | McBride et al. | |
| 8,560,492 B2 | 10/2013 | Yuan | |
| 8,838,481 B2 | 9/2014 | Moshfeghi | |
| 8,872,620 B2 | 10/2014 | Higemoto et al. | |
| 8,935,052 B2 | 1/2015 | Hermann | |
| 9,161,175 B1 | 10/2015 | Smith et al. | |
| 2007/0018799 A1 | 1/2007 | Funayose et al. | |
| 2007/0090965 A1 | 4/2007 | McCall | |
| 2007/0162191 A1 | 7/2007 | Matsubara et al. | |
| 2007/0222746 A1 | 9/2007 | LeVine | |
| 2008/0232431 A1 | 9/2008 | Sanji et al. | |
| 2009/0143923 A1 | 6/2009 | Breed | |
| 2009/0289759 A1 | 11/2009 | Tsuchiya et al. | |
| 2010/0033298 A1 | 2/2010 | Kaihori et al. | |
| 2010/0076622 A1 | 3/2010 | Dickerhoof et al. | |
| 2010/0097239 A1 | 4/2010 | Campbell | |
| 2010/0148947 A1 | 6/2010 | Morgan et al. | |
| 2010/0171642 A1 | 7/2010 | Hassan et al. | |
| 2010/0308961 A1 | 12/2010 | Ghabra | |
| 2011/0109447 A1 | 5/2011 | Saguchi | |
| 2011/0218709 A1 | 9/2011 | Hermann | |
| 2011/0254503 A1 | 10/2011 | Widmer et al. | |
| 2011/0257973 A1 | 10/2011 | Chutorash et al. | |
| 2011/0309922 A1 | 12/2011 | Ghabra et al. | |
| 2012/0092129 A1* | 4/2012 | Lickfelt | 340/5.72 |
| 2012/0218128 A1 | 8/2012 | Tieman et al. | |
| 2012/0223810 A1 | 9/2012 | Petrucci et al. | |
| 2012/0239248 A1 | 9/2012 | Bobbitt | |
| 2012/0262340 A1 | 10/2012 | Hassan et al. | |
| 2012/0282906 A1 | 11/2012 | Frye et al. | |
| 2012/0286926 A1 | 11/2012 | Higemoto et al. | |
| 2013/0342379 A1 | 12/2013 | Bauman et al. | |
| 2014/0136024 A1 | 5/2014 | Herthan | |
| 2014/0253287 A1 | 9/2014 | Bauman et al. | |
| 2014/0253288 A1 | 9/2014 | O'Brien et al. | |

FOREIGN PATENT DOCUMENTS

| | | |
|---|---|---|
| CN | 102398566 A | 4/2012 |
| CN | 102602363 A | 7/2012 |
| CN | 102703516 A | 10/2012 |
| CN | 102758567 A | 10/2012 |
| DE | 69913607 T2 | 9/2004 |
| DE | 10341286 A1 | 4/2005 |
| DE | 102006037237 A1 | 2/2008 |
| DE | 10 2010 063 702 A1 | 6/2010 |
| DE | 102012203327 A1 | 9/2012 |
| FR | 2934223 A3 | 1/2010 |
| GB | 2498837 A | 7/2013 |
| GB | 2505287 A | 2/2014 |
| GB | 2509579 A | 7/2014 |
| JP | 2006299408 A | 11/2006 |
| JP | 2008231734 A | 10/2008 |
| WO | 2005024734 | 3/2005 |
| WO | 2005024734 A1 | 3/2005 |
| WO | 2007070739 A2 | 6/2007 |
| WO | 2007073969 | 7/2007 |
| WO | 2013010643 A1 | 1/2013 |

OTHER PUBLICATIONS

German Patent and Trademark Office, Office Action for the corresponding German Patent Application No. 10 2013 212 060.5 mailed Apr. 25, 2014.

Bloecher, Hans Ludwig et al., Trends in Automotive RF Wireless Applications and their Electromagnetic Spectrum Requirements, DaimlerChrysler AG, Research & Technology, 2005.

Chinese Patent and Trademark Office, First Office Action for the corresponding Chinese Patent Application No. 201310254858.6 dated May 5, 2015.

Office Action for U.S. Appl. No. 14/178,340 (US 2014/0253288) dated Nov. 4, 2015.

Office Action for U.S. Appl. No. 14/178,324 (US 2014/0253287) dated Dec. 2, 2015.

Amendment for U.S. Appl. No. 14/178,340 (US 2014/0253288) dated Feb. 4, 2016.

United States Patent and Trademark Office, U.S. Appl. No. 14/178,324 Amendment filed Mar. 12, 2016.

Office Action for U.S. Appl. No. 14/178,340 dated Apr. 19, 2016, 11 pages.

Office Action for U.S. Appl. No. 14/178,324 dated May 16, 2016.

* cited by examiner

VEHICLE REMOTE FUNCTION SYSTEM AND METHOD USING ULTRA-WIDE BAND SIGNALS

TECHNICAL FIELD

The following relates to a vehicle remote function system and a method for determining a location of a fob relative to a vehicle using ultra-wide band wireless signals.

BACKGROUND

Automotive vehicles may include passive entry systems that allow a user to access and start a vehicle just by holding a key, key fob or card. In operation, such systems may perform and/or enable vehicle access and vehicle start functions based on a determined location of the key in or around the vehicle.

To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob.

As a result, there exists a need for a vehicle remote function system and a method for locating the fob more precisely around the entire vehicle. Such a system and method would allow for more exact and encompassing zones using ultra-wide band wireless signals communicated between the fob and vehicle mounted antennas. The improved zoning strategy of such a system and method would allow zones to be custom tailored for individual vehicle needs and customer requirements.

SUMMARY

According to one embodiment disclosed herein, a vehicle remote function system is provided for determining a location of a fob relative to a vehicle. The system comprises a plurality of antennas adapted to be mounted at different locations in the vehicle, each antenna for use in transmitting and/or receiving ultra-wide band wireless signals to and/or from the fob. The system further comprises a controller adapted to be mounted in the vehicle and configured for communication with the antennas, the controller for use in determining the location of the fob relative to the vehicle based on ultra-wide band wireless signals transmitted between the antennas and the fob. The controller is configured to locate the fob within one of a plurality of three-dimensional zones, one of the plurality of zones configured to have a non-spherical shape.

According to another embodiment disclosed herein, a vehicle remote function system is provided for determining a location of a fob relative to a vehicle. The system comprises a controller adapted to be mounted in the vehicle and configured for communication with a plurality of antennas mounted at different locations in the vehicle. The controller is for use in determining the location of the fob based on ultra-wide band wireless signals transmitted between the antennas and the fob. The controller is configured to locate the fob within one of a plurality of three-dimensional zones, one of the plurality of zones configured to have a non-spherical shape.

According to a further embodiment disclosed herein, a method is provided for use in a vehicle remote function system, the method for determining a location of a fob relative to a vehicle. The method comprises transmitting ultra-wide band wireless signals between the vehicle and the fob. The method further comprises determining the location of the fob within one of a plurality of three-dimensional zones, one of the plurality of zones having a non-spherical shape, based on the ultra-wide band wireless signals transmitted between the vehicle and the fob.

A detailed description of these embodiments is set forth below together with accompanying drawings.

DETAILED DESCRIPTION

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
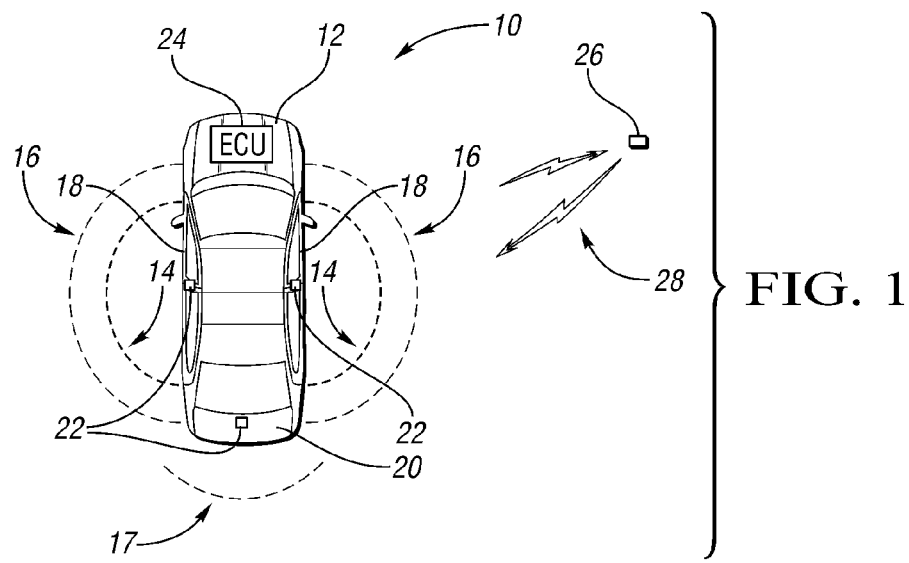
FIG. 1 is a simplified, exemplary diagram of a prior art passive entry system, including coverage zones.
Figure 2:
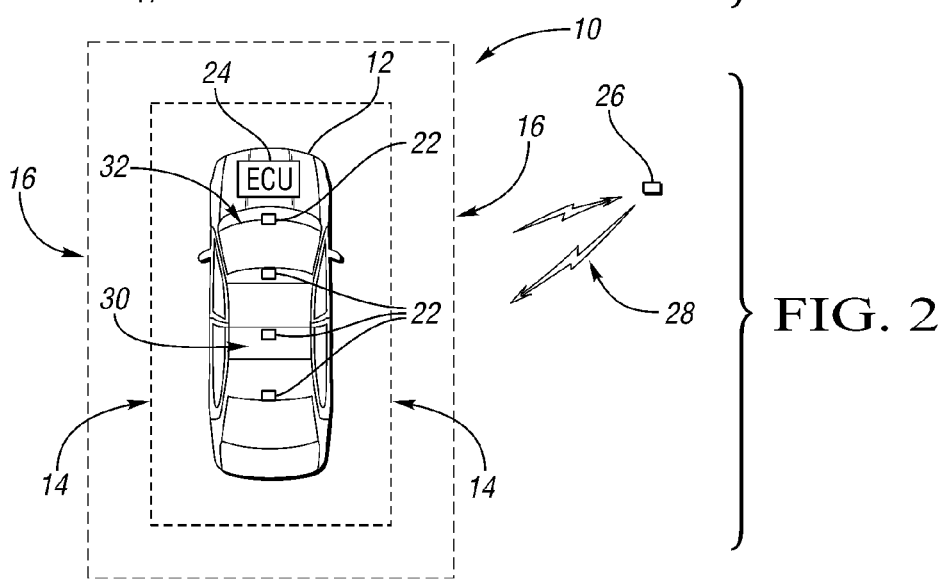
FIG. 2 is a simplified, exemplary diagram of a vehicle remote function system, including exemplary coverage zones, for determining a location of a fob relative to a vehicle using ultra-wide band wireless signals.
Figure 3:
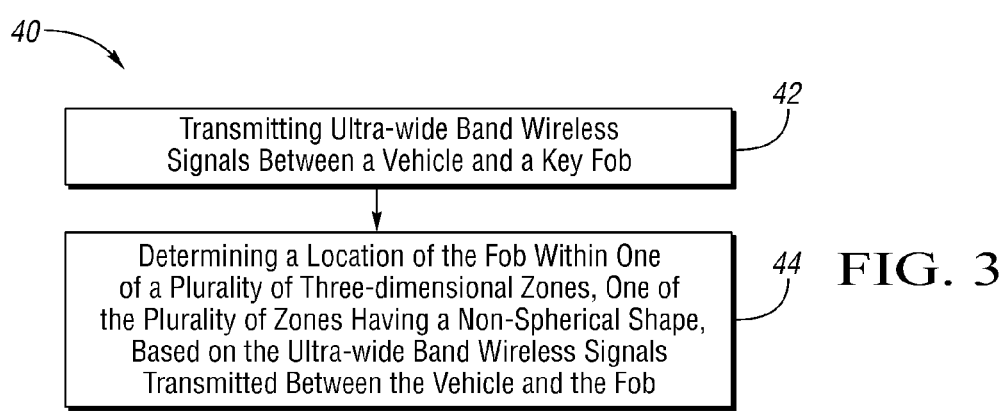
FIG. 3 is a simplified, exemplary flowchart of a method for determining a location of a fob relative to a vehicle using ultra-wide band wireless for use in a vehicle remote function system.

With reference to FIGS. 1-3, various embodiments of the method and system disclosed herein are shown and described. For ease of illustration and to facilitate understanding, similar reference numerals have been used throughout the following description to denote similar elements, parts, items or features in the drawings, where applicable.

As described previously, automotive vehicles may include passive entry systems that allow a user to access and start a vehicle just by holding a key, key fob or card. In operation, such systems may perform and/or enable vehicle access and vehicle start functions based on a determined location of the key in or around the vehicle. To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob. Thus, there exists a need for a vehicle remote function system and a method for locating the fob more precisely around the entire vehicle. Such a system and method would allow for more exact and encompassing zones using ultra-wide band wireless signals communicated between the fob and vehicle mounted antennas. The improved zoning strategy of such a system and method would allow zones to be custom tailored for individual vehicle needs and customer requirements.

FIG. 1 is a simplified, exemplary diagram of a prior art passive entry system 10 for a vehicle 12, including coverage zones 14, 16, 17. As seen therein, the applicable zones 14, 16, 17 are localized to areas around the doors 18 and trunk 20. Current passive entry systems 10 use low frequency (LF) antennas 22 located in the handles of the doors 18 and in the trunk 20, and that provide relatively small, concentrated lock/unlock zones 14, 16, 17 just around the individual doors 18 and the trunk 20. Locking/unlocking functions occur inside/outside the zones 14, 16, 17 as a result of wireless communication 28 of a vehicle-mounted controller or Electronic Control Unit (ECU) 24 with a key fob 26 via antennas 22.

For example, when the fob 26 is brought inside a range 14 of about 1.5 meters around the vehicle doors 18, an unlock command may be issued that results in the performance of a vehicle door unlock function or operation. When the fob 26 is taken outside a range 16 of about 2.0 meters around the vehicle doors 18, a lock command may be issued that results in the performance of a vehicle door lock function or operation. All other areas outside of these small zones 14, 16, 17 are "dead zones" where no locking or unlocking functions occur.

As previously described, the ECU or controller 24 determines the location of the key fob 26 based on the transmission of radio frequency (RF) or low frequency (LF) signals (e.g., 125 kHz) between the key antenna (not shown) and the vehicle based antennas 22, typically by using the strength of the signals 28 to indicated range. The zones 14, 16, 17 created with the use of antennas 22 are three-dimensional and have a spherical shape, but also may be described as having a circular or arching shape in a cross-section of the zones 14, 16, 17 taken in a horizontal plane substantially parallel to the ground.

FIG. 2 is a simplified, exemplary diagram of a vehicle remote function system 10, including exemplary coverage zones 14, 16, for determining a location of a fob 26 relative to a vehicle 12 using ultra-wide band wireless signals 28. The remote function system 10 shown in FIG. 2 and disclosed herein is able to locate the fob 26 more precisely around the entire vehicle 12 allowing for more exact and encompassing zones between the fob 26 and antennas 22 located in the vehicle 12. FIG. 2 illustrates this improved zoning strategy, with exemplary zones 14, 16. These zones 14, 16 may be custom tailored for individual vehicle needs and customer requirements.

The system shown in FIG. 2 implements full lock and unlock zones 14, 16 around the entire vehicle 12. Via triangulation, trilateration, or the use of a Kalman filter, ECU 24 can precisely locate the fob 26 around the entire vehicle 12 allowing for more encompassing zones. In particular, zones 14, 16 may be created that completely envelope the whole vehicle 12 and allow for the fob 26 to be tracked in and out of these zones 14, 16 and perform locking/unlocking functions relative to the location of the fob 26, such as performing an unlock operation when the fob 26 moves into zone 14, and a lock operation when the fob 26 moves outside zone 16.

Ultra-wide band (UWB) antennas 22 at various locations in/on the vehicle 12 can provide tailored lock/unlock zones 14, 16 around the entire vehicle 12, with locking/unlocking or other vehicle functions occurring inside/outside zones 14, 16 as a result of wireless communication 28 by ECU 24 with a key fob 26. In that regard, and as used herein, an antenna 22 may be an internal antenna of an UWB transceiver unit, or an antenna in communication with a centrally located UWB transceiver, such as via coaxial cabling, which centrally located UWB transceiver may be provided as part of ECU 24.

The UWB antennas 22 may be positioned at different locations in/on the vehicle 12. As seen in FIG. 2, one antenna 22 may be located in the instrument panel area 32 of the vehicle 12, while three other antennas 22 may be located in the headliner 30 of the vehicle 12. It should be noted, however, that any number of antennas 22 may be employed and may be positioned at any of a variety of locations in/on the vehicle 12.

While two substantially rectangular zones 14, 16 are depicted in FIG. 2, any number of zones of other shapes and sizes/ranges may be employed or created. In that regard, the UWB system 10 of FIG. 2 permits as many zones to be created as desired, with each zone having any type of shape, size and/or location desired, including inside or outside the vehicle 12, on one or both sides of the vehicle 12, and/or in front or back of the vehicle 12, which zones may or may not circumscribe, envelope or encompass the vehicle 12, in whole or in part, and may have any orientation.

For example, in contrast to the prior art passive entry system depicted in FIG. 1, which has spherical shaped zones 14, 16, 17, the vehicle remote function system 10 illustrated in FIG. 2 allows for zones 14, 16 having sharp corners. The zones 14, 16 may be three-dimensional rectangular prisms, having a substantially rectangular cross-section in a horizontal plane parallel to the ground. Other shapes, however, may alternatively be used for these or additional zones, which may be spheres, regular or uniform three-dimensional prisms, or irregular or non-uniform in shape or volume. As well, differently shaped zones may be provided for use in remotely performing different vehicle functions, such as an arched zone for a door unlock function, an octagonal zone for a door lock function, and a square zone for a trunk release function.

Such zones may also be located inside or outside the vehicle, and may have any volume. For example, the zones 14, 16 illustrated in FIG. 2 are located outside the vehicle 12 and encompass and/or have a volume greater than that of the vehicle 12. However, the system shown in FIG. 2 allows for zones that may be located outside the vehicle 12 on one side thereof, such as may be desired to allow a door unlock function only when the fob 26 approaches the vehicle 12 from one side.

The system 10 of FIG. 2 also allow for zones that may be located inside the vehicle 12, in whole or in part, and that may have a relatively small volume, such as less than the volume of an average person. Such smaller zones located inside the vehicle 12 may be used to determine the precise location of the fob 26 within the vehicle, such as in a vehicle glove box and/or for use in push-to-start systems.

The zones employed or created may also be provided for use in remote performance of other vehicle functions in addition to or instead of remote door lock/unlock or trunk release. For example, a combination of zones may be created outside the vehicle 12 which can be used to recognize gestures by a user as the fob 26 moves (which may include back and forth movement) between zones in order to perform remote engine start, headlight activation and/or any other type of vehicle function.

With reference again to FIG. 2, a vehicle remote function system 10 is provided for determining a location of a fob 26 relative to a vehicle 12. The system 10 may comprise a plurality of antennas 22 adapted to be mounted at different locations in the vehicle 12. Each antenna 22 is for use in transmitting and/or receiving ultra-wide band wireless signals 28 to and/or from the fob 12, which is also provided with an antenna and transmitter/transceiver (not shown).

The system 10 may also comprise a controller 24 adapted to be mounted in the vehicle 12 and configured for communication with the antennas 22. The controller 24 is for use in determining the location of the fob 26 relative to the vehicle 12 based on ultra-wide band wireless signals 28 transmitted between the antennas 22 and the fob 26. The controller 24 is configured to locate the fob within one of a plurality of three-dimensional zones 14, 16, wherein one of the plurality of zones 14, 16 configured to have a non-spherical shape.

As previously described, one of the plurality of zones 14, 16 configured to have a non-spherical shape may be configured to substantially envelope the vehicle 12. One of the plurality of zones 14, 16 configured to have a non-spherical shape may be configured to have a substantially rectangular cross-section in a horizontal plane. As well, one of the plurality of zones 14, 16 configured to have a non-spherical shape is configured to be positioned substantially outside the vehicle.

As also previously described, one of the plurality of zones configured to have a non-spherical shape may be configured to be positioned on a side of the vehicle and to have a volume less than a volume of the vehicle. One of the plurality of zones may be configured to have a volume less than a volume of a person, may be configured to be positioned substantially outside the vehicle, and/or may be configured to be positioned substantially inside the vehicle.

The plurality of antennas 22 may comprise an antenna 22 adapted to be mounted in a vehicle headliner 30 and an antenna 22 adapted to be mounted in a vehicle instrument panel 32. The controller 24 may also be configured to determine the location of the fob using a Kalman filter, trilateration, triangulation, or any other similar means or method.

As seen in FIG. 2, when the fob 26 is brought inside a first range 14 anywhere around the vehicle 12, an unlock command may be issued that results in the performance of a vehicle door unlock function or operation. When the fob 26 is taken outside a second range 16 anywhere around the vehicle 12, a lock command may be issued that results in the performance of a vehicle door lock function or operation.

Referring next to FIG. 3, a simplified, exemplary flowchart of a method 40 is shown for determining a location of a fob relative to a vehicle using ultra-wide band wireless signals, the method 40 for use in a vehicle remote function system, such as that described in connection with FIG. 2. As seen in FIG. 3, the method 40 may comprise transmitting 42 ultra-wide band wireless signals between the vehicle and the fob. The method may further comprise determining 44 the location of the fob within one of a plurality of three-dimensional zones, one of the plurality of zones having a non-spherical shape, based on the ultra-wide band wireless signals transmitted between the vehicle and the fob.

As previously described in connection with the system depicted in FIG. 2, the one of the plurality of zones having a non-spherical shape may substantially envelope the vehicle. As well, the one of the plurality of zones having a non-spherical shape may be positioned substantially outside the vehicle on a side of the vehicle and have a volume less than a volume of the vehicle. The one of the plurality of zones also may have a volume less than a volume of a person.

The activities, functions or steps of the system 10 and method 40 for determining the position of a key fob 26 relative to a vehicle 12 described above may also be implemented in or as a computer readable medium having non-transitory computer executable instructions stored thereon for determining a location of a key fob for use in a vehicle access system. More specifically, the computer executable instructions stored on the computer readable medium may include instructions for performing any or all of the activities, functions or steps described above in connection with the system 10 or method 40 disclosed herein.

In that regard, the ECU 24 may comprise an appropriately programmed processor or other hardware, software, or any combination thereof for performing the functions described herein. The ECU 24 may also comprise a memory, which may provide the computer readable medium and have the computer executable instructions stored thereon described above.

As is readily apparent from the foregoing, a vehicle remote function system and a method have been described for locating a key fob more precisely around a vehicle. The embodiments of the system and method described allow for more exact and encompassing zones using ultra-wide band wireless signals communicated between the fob and vehicle mounted antennas. The improved zoning strategy of the embodiments of the system and method described allow zones to be custom tailored for individual vehicle needs and customer requirements.

While various embodiments of a vehicle remote function system and a method for locating a key fob relative to a vehicle using ultra-wide band wireless signals have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A vehicle remote function system for determining a location of a fob relative to a vehicle, the system comprising:
   a plurality of antennas adapted to be mounted at different locations in the vehicle, each antenna for use in transmitting and/or receiving ultra-wide band wireless signals to and/or from the fob; and
   a controller adapted to be mounted in the vehicle and configured for communication with the antennas, the controller for use in determining the location of the fob relative to the vehicle based on ultra-wide band wireless signals transmitted between the antennas and the fob;
   wherein the controller is configured to locate the fob within one of a plurality of three-dimensional zones, one of the plurality of zones configured to have a substantially polygonal cross-section in a horizontal plane and wherein the controller is configured to recognize back and forth movement of the fob between a combination of zones as a command to perform a vehicle function.

2. The system of claim 1 wherein the one of the plurality of zones configured to have a non-spherical shape is configured to substantially envelope the vehicle.

3. The system of claim 1 wherein the one of the plurality of zones configured to have a non-spherical shape is configured to have a substantially rectangular cross-section in a horizontal plane.

4. The system of claim 1 wherein the one of the plurality of zones configured to have a non-spherical shape is configured to be positioned substantially outside the vehicle.

5. The system of claim 4 wherein the one of the plurality of zones configured to have a non-spherical shape is configured to be positioned on a side of the vehicle and to have a volume less than a volume of the vehicle.

6. The system of claim 1 wherein the one of the plurality of zones is configured to have a volume less than a volume of a person.

7. The system of claim 6 wherein the one of the plurality of zones is configured to be positioned substantially outside the vehicle.

8. The system of claim 1 wherein the one of the plurality of zones is configured to be positioned substantially inside the vehicle.

9. The system of claim 1 wherein the plurality of antennas comprise an antenna adapted to be mounted in a vehicle headliner and an antenna adapted to be mounted in a vehicle instrument panel.

10. The system of claim 1 wherein the controller is configured to determine the location of the fob using one of a Kalman filter, trilateration and triangulation.

11. A vehicle remote function system for determining a location of a fob relative to a vehicle, the system comprising:
a controller adapted to be mounted in the vehicle and configured for communication with a plurality of antennas mounted at different locations in the vehicle, the controller for use in determining the location of the fob based on ultra-wide band wireless signals transmitted between the antennas and the fob;
wherein the controller is configured to locate the fob within one of a plurality of three-dimensional zones, one of the plurality of zones configured to have a substantially polygonal cross-section in a horizontal plane and wherein the controller is configured to recognize back and forth movement of the fob between a combination of zones as a command to perform a vehicle function.

12. The system of claim 11 wherein the one of the plurality of zones configured to have a non-spherical shape is configured to substantially envelope the vehicle.

13. The system of claim 11 wherein the one of the plurality of zones configured to have a non-spherical shape is configured to have a substantially rectangular cross-section in a horizontal plane.

14. The system of claim 11 wherein the one of the plurality of zones configured to have a non-spherical shape is configured to be positioned substantially outside the vehicle.

15. The system of claim 14 wherein the one of the plurality of zones configured to have a non-spherical shape is configured to be positioned on a side of the vehicle and to have a volume less than a volume of the vehicle.

16. The system of claim 11 wherein the one of the plurality of zones is configured to have a volume less than a volume of a person.

17. A method for use in a vehicle remote function system, the method for determining a location of a fob relative to a vehicle, the method comprising:
transmitting ultra-wide band wireless signals between the vehicle and the fob; and
determining the location of the fob within one of a plurality of three-dimensional zones, one of the plurality of zones having a substantially polygonal cross-section in a horizontal plane, based on the ultra-wide band wireless signals transmitted between the vehicle and the fob, wherein back and forth movement of the fob between a combination of zones acts as a command to perform a vehicle function.

18. The method of claim 17 wherein the one of the plurality of zones having a non-spherical shape substantially envelopes the vehicle.

19. The method of claim 17 wherein the one of the plurality of zones having a non-spherical shape is positioned substantially outside the vehicle on a side of the vehicle and has a volume less than a volume of the vehicle.

20. The method of claim 17 wherein the one of the plurality of zones has a volume less than a volume of a person.

* * * * *